United States Patent [19]

Kimoto et al.

[11] Patent Number: 5,241,533
[45] Date of Patent: Aug. 31, 1993

[54] PACKET SWITCHING NETWORK WITH ALTERNATE TRUNKING FUNCTION

[75] Inventors: Atsushi Kimoto, Hadano; Hironari Sakai, Yamato; Michio Suzuki, Odawara; Masashi Ikeda, Kanagawa, all of Japan

[73] Assignees: Hitachi, Ltd.; Hitachi Software Engineering Co., Ltd., both of Tokyo, Japan

[21] Appl. No.: 707,531

[22] Filed: May 30, 1991

Related U.S. Application Data

[63] Continuation-in-part of Ser. No. 382,148, Jul. 19, 1989, Pat. No. 5,034,945.

[30] Foreign Application Priority Data

Jul. 21, 1988 [JP] Japan ............................... 63-182722
May 30, 1990 [JP] Japan ................................ 2-138309

[51] Int. Cl.⁵ .............................................. H04J 3/26
[52] U.S. Cl. ........................................ 370/13.1; 370/16
[58] Field of Search .................... 370/13.1, 14, 15, 16, 370/60, 94.1; 371/11.2

[56] References Cited

U.S. PATENT DOCUMENTS

| | | | |
|---|---|---|---|
| 4,679,189 | 7/1987 | Olson et al. | 370/60 |
| 4,745,593 | 5/1988 | Stewart | 370/60 |
| 5,034,945 | 7/1991 | Kimoto et al. | 370/13.1 |
| 5,128,926 | 7/1992 | Perlman et al. | 370/94.1 |
| 5,142,531 | 8/1992 | Kirby | 370/94.1 |

OTHER PUBLICATIONS

"Logic of Information Network" by S. Noguchi, et al., published by Iwanami Shoten, (1982), pp. 200-209.

*Primary Examiner*—Douglas W. Olms
*Assistant Examiner*—Melvin Marcelo
*Attorney, Agent, or Firm*—Pennie & Edmonds

[57] ABSTRACT

In a packet switching network, in order to transmit a packet effectively, after transmission of a first packet from a source node to a destination node, a data for inhibiting a packet from being repeating to a specific trunk line from a node is set in a routing table associated with the node in accordance with a second packet received from the node. The associated routing table stores trunk lines for repeating in accordance with the destination node of the packet. The second packet represents occurrence of trouble on a transmission route for the first packet from the source node to the destination node. The transmission node includes the trunk line from the node. When the node has received a third packet directed to the destination node, the associated routing table is referred to determine a trunk line for repeating the third packet from trunk lines except for the specific trunk line in accordance with the destination node and the repeating inhibition data.

17 Claims, 4 Drawing Sheets

FIG. 4A

| A | A | a |
|---|---|---|
|   | C | b |
|   | E | e |
| C | C | b |
|   | E | e |
|   | E | e |
| D | C | b |
| E | C | b |
| F | E | e |

ROUTING TABLE AT NODE B

FIG. 4B

| A | B | b |   |
|---|---|---|---|
|   | F | g |   |
|   | B | b |   |
| B | F | g |   |
| D | D | c |   |
|   | F | g |   |
| E | B | b |   |
|   | F | g | X |
| F | B | b |   |

ROUTING TABLE AT NODE C

PACKET SWITCHING NETWORK WITH ALTERNATE TRUNKING FUNCTION

CROSS-REFERENCE TO THE RELATED APPLICATION

This application is a continuation-in-part application of the U.S. application Ser. No. 07/382,148 now U.S. Pat. No. 5,034,945 entitled "PACKET SWITCHING NETWORK WITH ALTERNATE TRUNKING FUNCTION TO REPEAT AVOIDING LOOPED TRUNK", filed Jul. 19, 1989 by Atsushi Kimoto, Michio Suzuki, and Masashi Ikeda based on Japanese Patent application No. 63-182,722, assigned to the present assignees. The disclosure of the U.S. application of Ser. No. 07/382,148 ,now U.S. Pat. No. 5,034,945 is incorporated herein by reference.

BACKGROUND OF THE INVENTION

1. Field of the Invention

The present invention relates to a route selection control system for a packet switching network, and more particularly to an alternate trunking function for a packet switching network suitable for preventing a transfer delay time of a packet in a packet switching network from increasing by occurrence of the "ping-pong phenomenon" in which the packet is repeatedly transmitted between two nodes due to a failure of a transmission path of the switching network or the like.

2. Description of the Related Art

As a conventional technique for avoiding occurrent of the ping-pong phenomenon in the packet switching network, is described in, for example, "LOGIC OF INFORMATION NETWORK" edited and written by Shoichi Noguchi et al., published by Iwanami Shoten on Jun. 10, 1982, at pages 200-209.

In this technique, a source address is provided in a packet and occurrence of the ping-pong phenomenon is suppressed by using the source address. However, even if this method is used, the ping-pong phenomenon may occur. More particularly, a packet is provided with a counter which is incremented by one each time the packet is repeated and when a count of the counter exceeds a fixed value, the packet is discarded.

The conventional technique does not take account of repeating while avoiding the route on which the ping-pong phenomenon occurs in the packet switching network. Thus, a succeeding packet is transmitted on the same route, so that the ping-pong phenomenon may occur again with high possibility. Consequently, there is a problem that a transfer delay time of the packet and the traffic in the packet switching network are increased.

SUMMARY OF THE INVENTION

It is an object of the present invention to solve the problems in the prior art and to provide an alternate trunking system for a packet switching network capable of preventing, when the ping-pong phenomenon of a packet occurred in the packet switching network, that of another packet to the packet, to thereby reduce a transfer delay time of the another packet and prevent increased traffic due to the ping-pong phenomenon.

In order to achieve the above object, a method of effectively transmitting a packet in a packet switching network includes the steps of:

after transmission of a first packet from a source node to a destination node, setting data for inhibiting the packet from being repeated from a node to a specific trunk line in a routing table associated with the node in accordance with a second packet received by the node, the associated routing table storing trunk lines for repeating in accordance with the destination node of the packet, the second packet representing occurrence of trouble on a transmission route for the first packet from the source node to the destination node, the transmission route including the trunk line from the node;

determining a trunk line for repeating a third packet from trunk lines except for the specific trunk line in accordance with the destination node and the repeating inhibition data with reference to the associated routing table when the node has received the third packet directed to the destination node, and repeating the third packet onto the determined trunk line.

As described above, according to the present invention, when the ping-pong phenomenon has occurred, a subsequent packet is repeated avoiding the route on which the ping-pong phenomenon has occurred so that the subsequent packet can be transmitted on an alternate repeating route. Accordingly, a transfer delay time in the packet switching network due to the occurrence of the ping-pong phenomenon can be reduced and increased traffic due to the occurrence of the ping pong phenomenon can be prevented.

Further, when the traffic is concentrated temporarily, a packet cannot be inhibited from being repeated to the route on which the ping-pong phenomenon has occurred and accordingly it is possible to avoid selection of an unnecessary alternate trunking route.

BRIEF DESCRIPTION OF THE DRAWINGS

FIGS. 4A and 4B are diagrams showing routing tables at nodes B and c; and

DESCRIPTION OF THE PREFERRED EMBODIMENT

An embodiment of an alternate trunking system for a packet switching network according to the present invention is now described in detail with reference to the accompanying drawings.

Figure 1:
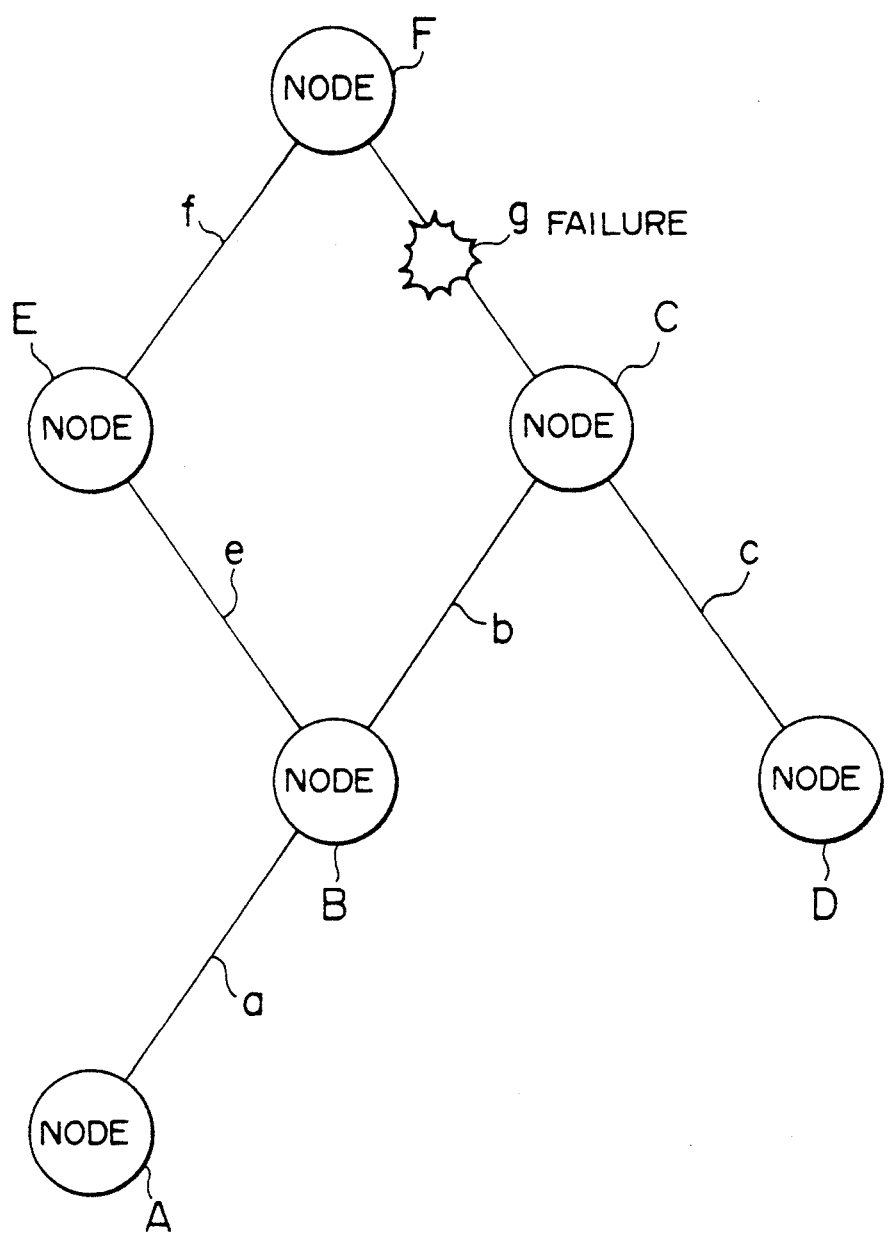
FIG. 1 schematically illustrates a packet switching network according to an embodiment of the present invention.
Figure 2:
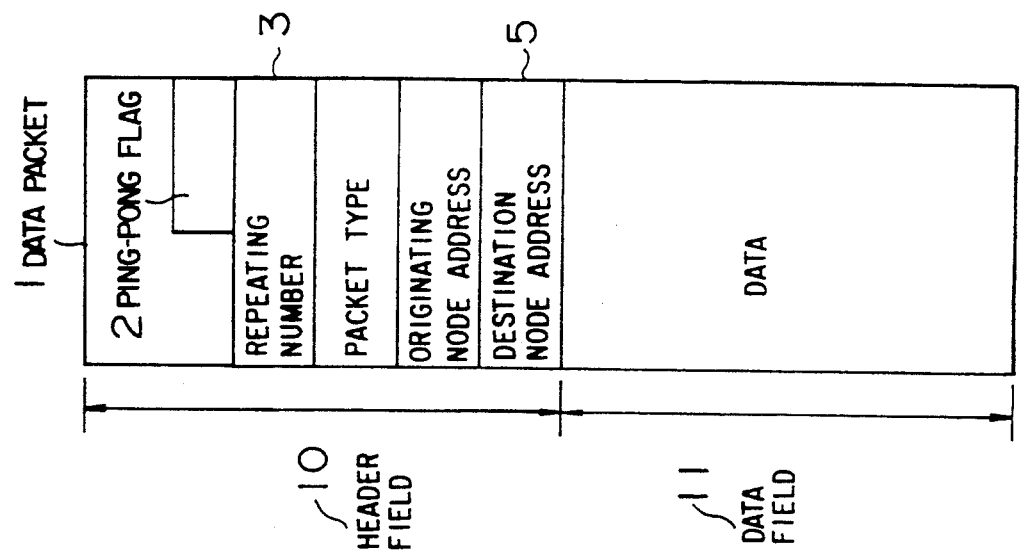
FIG. 2 shows a format of a data packet.
Figure 3:
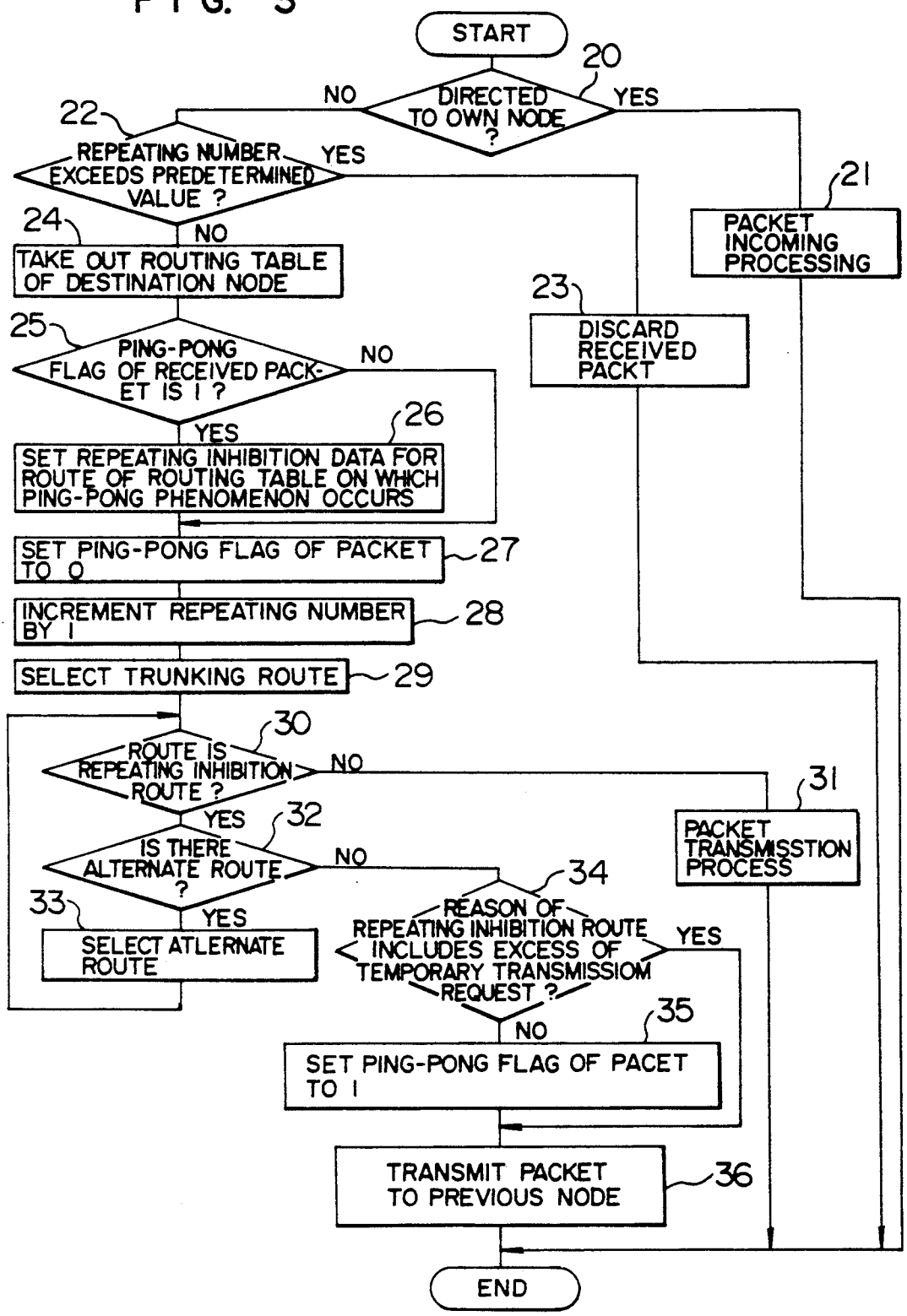
FIG. 3 is a flow chart illustrating operation of nodes.

FIG. 1 schematically illustrates a packet switching network according to an embodiment of the present invention, FIG. 2 shows a format of a data packet and FIG. 3 is a flowchart illustrating operation of nodes. In FIGS. 1 and 2, A, B, C, D, E and F represent nodes, a, c, d, e, f and g represent trunk lines, numeral 1 denotes a data packet, 2 a ping-pong flag field, 3 a repeating number field, 10 an intranetwork control header field and 11 a data field. It is shown that the trunk line g is under trouble. FIGS. 4A and 4B show routing tables at the nodes B and C.

The packet switching network shown in FIG. 1 includes a plurality of nodes A to F interconnected to one another Each of the nodes is provided with a routing table and selects one of the table's trunking routes except for a trunking route from which a packet has been received in accordance with the table so that the packet is repeated through the selected trunking route. The data packet 1 transmitted and received between nodes includes, as shown in FIG. 2, the intra-network control header field 10 and the data field 11. The header field 10 includes areas for setting the ping-pong flag 2 and the number of repeating times 3 therein.

According to the present invention, in the packet switching network, a node receiving a packet sets the ping-pong flag in the packet to return the packet to an originating node which has transmitted the packet so that the originating node detects the ping-pong phenomenon in accordance with the ping-pong flag in the packet. Thereafter, a subsequent packet is inhibited from being transmitted through a trunking route on which the ping-pong phenomenon occurred, for a predetermined period of time, and the subsequent packet is transmitted to another alternate trunking route.

In the packet switching network constructed as described above, it is assumed that the node A transmits a packet 1 shown in FIG. 2 through the node B and C to the node F and further the trunk line b is higher than the trunk line e in the priority of the node B for selection of a route for repeating a packet directed to the node F.

In this case when the node B receives the packet 1 from the node A, the node B increments the number of repeating times in the repeating number field 3 of the packet by one and transmits the packet 1 to the node C through the trunk line b. The node C attempts to repeat the received packet toward the node F through the trunk line g. However, in this example, since the trunk line g is under trouble, the node C sets data for inhibiting the repeating of the packet to the node F through the trunk line g, in the routing table thereof, as shown in FIG. 4B. Then, after the number of repeating times in the repeating number field 3 of the packet 1 is incremented by one, the packet 1 is returned back to the node B. At this time, since the node C returns the packet 1 onto the trunk line from which the packet 1 has been received, the node C sets the ping-pong flag 2 of the header field 10 of the packet 1 to be "1". When the reason why the node C cannot transmit the packet to the node F is temporarily concentrated traffic, the packet 1 is returned back to the node B without setting the ping-pong flag to be "1".

When the node B which has received the returned packet 1 detects occurrence of the ping-pong phenomenon from the ping-pong flag 2 of the packet 1, the node B sets the routing table so that the packet directed to the node F is inhibited from being repeated to the node C as shown in FIG. 4A. Then, the node B resets the ping-pong flag to be "0" and increments the number of repeating times in the repeating number field 3 of the packet 1 by one. The node B determines an alternate trunk line e so that the packet 1 is transmitted to the node E through the trunk line e and transmits it to the node E. Consequently, the packet 1 is delivered to the node F through the node E.

Thereafter, subsequent packets directed to the node F are inhibited from being repeated through the route directed to the node C and ar transmitted from the node B to the node E.

It is only the packet directed to the node F that the node B inhibits to repeat through the route b directed to the node C and accordingly the node B can transmits the packet directed to the node C through the route b directed to the node C.

Packet reception processing at each node is now described with reference to a flow chart shown in FIG. 3.

When the node has received a packet, the node determines whether the received packet is directed to itself or not (step 20). When the packet is directed to the node itself, the node performs the packet incoming processing (step 21). In step 20, when it is determined that the received packet is directed to another node, it is determined whether the number of repeating times in the field 3 exceeds a predetermined value (step 22). When the number of repeating times exceeds the predetermined value, the received packet is discarded and the processing is ended (step 23).

In step 23, when the number of repeating times in the field 3 is the predetermined value or less, the routing table elements of a destination node of the received packet are taken out (step 24). Further, it is determined that the ping-pong flag 2 of the received packet is set to be "1" or not (step 25). In step 25, when the ping-pong flag 2 of the received packet is set to be "1", it is regarded that the ping-pong phenomenon occurs and repeating inhibition data is set for the route, on which the ping-pong phenomenon has been detected of one of the routing table elements taken out in step 24, with respect to the destination node (step 26). In the step 25, when the ping-pong flag 2 of the received packet is set to be "0" or after the completion of step 26, the ping-pong flag 2 of the header field 10 of the packet to be repeated is reset to be "0" (step 27) and the number of repeating times in the repeating field 3 is incremented by one (step 28), so that a trunking route is selected from the routing table elements with respect to the destination node (step 29).

It is determined whether the repeatin inhibition data is set for the route selected in step 29 or not (step 30). When the repeating inhibition data is not set for the route, the packet is transmitted through the route (step 31).

When the repeating inhibition data is set for the route selected in step 30 the routing table elements are searched for an alternate route (steps 32 and 33). When there is the alternate route, the route is selected (step 33). When there is no alternate route, that is, when there is no trunk line except the line from which the packet has been received, it is determined whether the inhibition reason of the repeating inhibition route is an excess of temporary transmission requests for the trunk line or not (step 34). When it is not an excess of the temporary transmission requests, the ping-pong flag 2 of the header field 10 of the packet is set to be "1" (step 35) and the packet is transmitted to the previous node (step 36).

When the judgment in step 34 is not based on the excess of the temporary transmission requests, the packet is transmitted to the previous node while maintaining the ping-pong flag to be "0" (step 36).

Each of the nodes performs the reception processing of the packet as described above, while when the ping-pong flag of the packet to be returned to the previous node is not set to be "1", the repeating of packet at the previous node is not inhibited and accordingly the node which has returned the packet to the previous node receives subsequent packet. However, at this time, there is high possibility that the excess of temporary transmission requests is dissolved and in this case the packet can be transmitted to an optimum trunking route.

Release of the repeating inhibition at the node B with respect to the route directed to the node C of the packet directed to the node F may be made by the node B after an elapse of a period of predetermined time. Further, it can be performed as follows.

Figure 5:
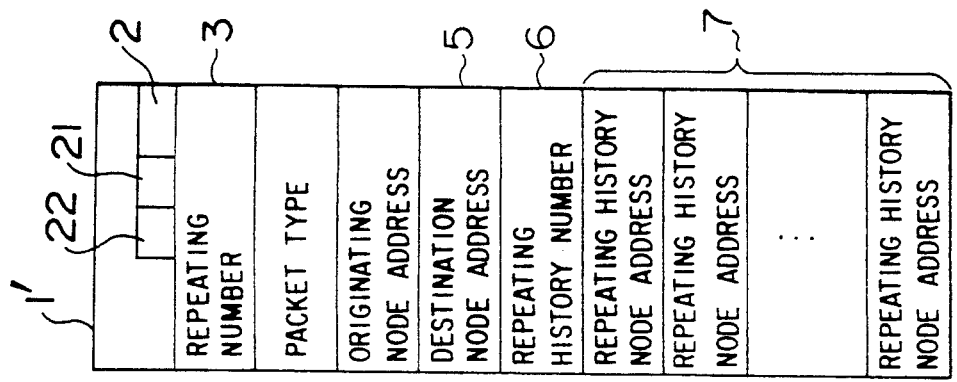
FIG. 5 shows a format of a control packet.

After elapse of the predetermined time period, the node B transmits a control packet as shown in FIG. 5 to the node F through the node C. The control packet is the same structure as a looped trunk detection packet. In the control packet, the originating node is the node B, the destination node is the node F. A trouble check bit is set in a field 21. When the repeating inhibition data is set, the node C updates a repeating history number of the control packet and adds the own node address in the control packet, so that the control packet is transmitted to the node F.

If the trouble on the trunk line g is not dissolved, the control packet is returned from the node C after the ping-pong flag is set and therefore the repeating inhibition data is not reset but a timer in the node B is reset and restarted. When the control packet is transmitted to the node F, the node F determines that the received packet is the control packet from the trouble check bit, prepares a repeating inhibition release notification packet, and transmits the notification packet to the nodes having repeating history node addresses written in the control packet. When the nodes receive the notification packet, the nodes reset the repeating inhibition data.

As described above, the node which has received a packet usually selects a trunking route except for the route from which the packet has been received and repeats the packet. When there is no trunking route for transmitting the packet due to a trouble of the trunking route or a node existing on the way of the trunking route and the packet is returned to the previous node, the ping-pong flag of the header field of the packet is set to be "1". The node which has received the packet checks the ping-pong flag of the header field of the packet. When the node detects the set ping-pong flag, a subsequent packet is inhibited from being transmitted through the trunking route directed to the node which has returned the packet.

Thus, the subsequent packet is repeated onto another trunking route while avoiding the route in which the ping-pong phenomenon occurs. Accordingly, a transfer delay time of packet due to the occurrence of the ping-pong phenomenon is reduced.

Further, a node which returns a packet to a previous node sets the ping-pong flag of the header field of the packet to be "0" when the reason why the packet cannot be transmitted through the trunking rout is that temporarily concentrated transmission requests to the trunking route are avoided.

In the manner, the node receiving the returned packet transmits the returned packet to another trunking route while a subsequent packet can be transmitted onto the trunking route in which the ping-pong phenomenon occurs.

This processing is made based on the fact that there is a high possibility that the temporarily concentrated transmission requests onto other trunking route are dissolved when the node which has returned the packet to the previous node receives the subsequent packet, and in this case the ping pong phenomenon does not occur, so that an optimum trunking route can be selected.

What is claimed is:

1. A method of transmitting a packet in a packet switching network, comprising the steps of:
    transmitting a first packet from a source node, said first packet having information indicating a destination node;
    receiving said first packet at a repeater node;
    determining a trunk line from among a plurality of trunk lines connected to said repeater node by referencing said information within said first packet against a routing table associated with said repeater node;
    repeating said first packet onto said determined trunk line;
    receiving a second packet at said repeater node, said second packet having a field indicative of a failure of a trunk line between said repeater node and said destination node;
    setting a repeater inhibition data in said routing table for inhibiting a packet from being repeated from the repeater node onto a specified trunk line, said specified trunk line being in accordance with said second packet;
    receiving a third packet having information indicating said destination node;
    determining a trunk line other than said specified trunk line from among said plurality of trunk lines for the third packet to be repeated onto in accordance with the repeater inhibition data within the associated routing table; and
    repeating the third packet onto the determined trunk line.

2. A method according to claim 1, wherein
    said setting step includes the steps of:
    detecting the occurrence of the trouble on the transmission route from control data included in the second packet; and
    setting the repeating inhibition data in the associated routing table.

3. A method according to claim 2, further comprising the steps of:
    transmitting a looped trunk detection packet when the first packet is discarded; and
    generating the second packet including the control data when it is detected from the looped trunk detection packet that a loop is formed in the transmission route by the trouble.

4. A method according to claim 2, wherein
    the second packet is the first packet having the control data set therein.

5. A method according to claim 4, further comprising the step of:
    repeating the first packet not having the control data to the node as the second packet when the trouble is temporarily concentrated traffic.

6. A method according to claim 1, further comprising the step of:
    resetting the repeating inhibition data after elapse of a predetermined time period from the setting of the repeating inhibition data.

7. A method according to claim 1, further comprising the steps of:
    transmitting a control packet to the destination node from the repeater node having said repeater inhibition data over said specified trunk line after elapse of a predetermined time period from the setting of the repeater inhibition data;
    returning a response packet from the destination node to said repeater node in response to receiving said control packet; and
    resetting the repeater inhibition data at the node in response to the response packet.

8. A packet switching network having a source node, a destination node, and plurality of repeater nodes, each repeater node comprising:
- a plurality of trunk lines connected to said node;
- a repeater means having means for receiving a packet data from and for transmitting a packet data onto said trunk lines;
- an associated routing table for storing a routing data;
- means for selecting a trunk line from among said trunk lines by referencing a destination information within a packet data with said routing data;
- means for setting, subsequent to said repeater node repeating toward a destination node a first packet received from a source node, repeater inhibition data within said routing table for inhibiting a packet from being repeated from the repeater node onto a specified trunk line, in accordance with a second received packet, the second packet representing occurrence of a trouble on a transmission route for the first packet from the source node to the destination node, and the transmission route including said specified trunk line; and
- means, associated with said selecting means, for determining a trunk line for a third packet, said third packet having a destination information indicating said destination node, to be repeated onto in accordance with said repeater inhibition data with reference to the associated routing table when the third packet to the destination node has been received.

9. A packet switching network according to claim 8, wherein
said setting means includes:
means for detecting the occurrence of the trouble on the transmission route from control data to set the repeating inhibition data in the associated routing table, the second packet is the first packet in which the control data is set.

10. A packet switching network according to claim 8, wherein
said determining means includes:
means for determining a trunk line without setting of the repeating inhibition data while the first packet having the control data set therein is defined as the second packet when the trouble on the transmission route is temporarily concentrated traffic.

11. A packet switching network according to claim 8, further comprising:
means for resetting the repeating inhibition data after elapse of a predetermined time period from setting of the repeating inhibition data.

12. A packet switching network according to claim 8, further comprising:
means for transmitting a control packet to the destination node after elapse of a predetermined time period from setting of the repeating inhibition data; and
means for resetting the repeating inhibition data in response to a response packet from the destination node.

13. A method of repeating a packet in a packet switching network, comprising the steps of:
repeating from a first node to a second node a first packet directed from a source node to a destination node;
determining a trunk line from among a plurality of trunk lines connected to said first node by referencing a destination direction information within said first packet against an associated routing table, said determined trunk line being a transmission path to the second node, said second node being on a transmission route, stored in said associated routing table, between said first node and said destination node,
repeating said first packet onto said determined trunk line;
transmitting a second packet from the second node to the first node in response to detection of occurrence of a trouble on a transmission route from the second node to the destination node;
setting, in the first node, a repeater inhibition data within said associated routing table for inhibiting a packet having a destination information indicating said destination node being repeated from the first node to the second node, said repeater inhibition data being in accordance with the second packet; and
determining another trunk line from among the trunk lines, said another trunk line being other than said trunk line between said first node and second node, when the first node receives a third packet directed to the destination node, in accordance with the the repeater inhibition data with reference to the associated routing table; and
repeating the third packet onto the determined trunk line.

14. A method according to claim 13, wherein
said transmitting step includes the step of:
setting control data in the first packet in response to the detection of the occurrence of the trouble on the transmission route at the second node to generate the set first packet as the second packet;
said setting step includes the steps of:
detecting the occurrence of the trouble on the transmission route from the control data set in the second packet at the first node; and
setting the repeater inhibition data in the associated routing table.

15. A method according to claim 14, further including a traffic determining step of determining the trouble to be a temporary concentration of traffic on a transmission route between said first node and said destination node and wherein
said transmitting step further includes the step of:
transmitting, at the second node, the first packet to the first node as the second packet without setting of the control data in the first packet in response to the traffic detecting step determining trouble on the transmission route as being temporarily concentrated traffic;
said determining steps includes:
determining another trunk line for the second packet to be repeated, from among all of said plurality of trunk lines with reference to the associated routint table without setting the repeating inhibition data in the routing table at the first node.

16. A method according to claim 13, further comprising the step of:
resetting the repeater inhibition data in the first node after elapse of a predetermined time period from setting the repeating inhibition data.

17. A method according to claim 13, further comprising the steps of:
transmitting a control packet to the destination node from the first node after elapse of a predetermined time period from setting of the repeating inhibition data; and
returning a response packet to the first node from the destination node; and
resetting the repeater inhibition data at the first node in response to the response packet.

* * * * *